United States Patent
Liao

(10) Patent No.: US 9,836,681 B1
(45) Date of Patent: Dec. 5, 2017

(54) RADIO FREQUENCY IDENTIFICATION DEVICE

(71) Applicant: WAYS TECHNICAL CO., LTD., Taoyuan (TW)

(72) Inventor: Shih-Wen Liao, Taoyuan (TW)

(73) Assignee: WAYS TECHNICAL CO., LTD., Taoyuan (TW)

( * ) Notice: Subject to any disclaimer, the term of this patent is extended or adjusted under 35 U.S.C. 154(b) by 0 days.

(21) Appl. No.: 15/185,392

(22) Filed: Jun. 17, 2016

(30) Foreign Application Priority Data

May 17, 2016 (TW) .............................. 105207178 U

(51) Int. Cl.
  *G06K 19/06* (2006.01)
  *G06K 19/07* (2006.01)
  *G06K 19/077* (2006.01)

(52) U.S. Cl.
  CPC ... *G06K 19/0704* (2013.01); *G06K 19/07773* (2013.01)

(58) Field of Classification Search
  CPC .................... G06K 19/0704; G06K 19/07773
  See application file for complete search history.

(56) References Cited

U.S. PATENT DOCUMENTS

| | | | | |
|---|---|---|---|---|
| 4,255,486 A * | 3/1981 | Burke, Jr. | ............... | B32B 25/02 428/356 |
| 4,727,403 A * | 2/1988 | Hida | ........................ | H01L 29/10 257/194 |
| 7,536,152 B2 * | 5/2009 | Inano | ................... | G06K 7/0008 340/10.2 |
| 2005/0141150 A1 * | 6/2005 | Bentley | ............... | C23C 18/1608 361/2 |
| 2007/0018179 A1 * | 1/2007 | Kub | .................... | H01L 29/0657 257/94 |
| 2008/0146148 A1 * | 6/2008 | Hulvey | ............... | H04W 52/287 455/41.1 |
| 2008/0174436 A1 * | 7/2008 | Landt | ............... | G06K 19/07749 340/572.7 |
| 2009/0009288 A1 * | 1/2009 | Fogg | .................. | G06K 19/0704 340/10.1 |
| 2011/0096271 A1 * | 4/2011 | Yoshida | ............ | G02F 1/133528 349/96 |

(Continued)

*Primary Examiner* — Thien M Le
*Assistant Examiner* — Asifa Habib
(74) *Attorney, Agent, or Firm* — Jackson IPG PLLC; Demian K. Jackson

(57) ABSTRACT

An RFID device includes: at least one solar cell including a substrate, a first conductive layer, an electron supplying layer, an electron receiving layer and a second conductive layer sequentially stacked thereon; and a RFID tag coupled to the solar cell through a telecommunication connection structure, and including a first antenna, a second antenna and a RFID chip, and the RFID chip includes a first RFID module, a second RFID module and a radio frequency determination module. The first antenna and the first RFID module are capable of passively receiving a driving signal of an external device and returning tag data, and the radio frequency determination module is capable of automatically determining the external driving signal, and the second RFID module and the second antenna actively transmit the tag data to the external device according to the electric power supplied by the solar CELL.

24 Claims, 7 Drawing Sheets

(56) References Cited

U.S. PATENT DOCUMENTS

| | | | |
|---|---|---|---|
| 2012/0056002 A1* | 3/2012 | Ritamaki | G06K 19/07786 235/492 |
| 2012/0313758 A1* | 12/2012 | Savarese | G06K 7/10079 340/10.1 |
| 2016/0217936 A1* | 7/2016 | Fukui | H01L 51/0072 |

* cited by examiner

RADIO FREQUENCY IDENTIFICATION DEVICE

FIELD OF THE INVENTION

The present invention relates to radio frequency identification (RFID) devices, more particularly to an RFID device combined with a solar cell and provided for active and passive data transmissions.

BACKGROUND OF THE INVENTION

In recent years, non-contact identification devices for transmitting radio signals become increasingly popular, and these devices generally come with a main body and an external read/write device for exchanging information to achieve the effects of information transmission and identification. Radio Frequency Identification (RFID) tag is a new radio transmission device used extensively in many areas such as logistics management, merchandise management, medical management, etc. Due to the non-contact characteristic and the simple application, RFID systems have gradually replace traditional contact identification systems such as barcode scanning identification systems.

The so-called RFID tag generally includes a RFID chip and an antenna coupled to the RFID chip. Radio signals are transmitted from the RFID chip to an external read/write device through the antenna for transmitting and receiving data to achieve the identification effect.

The RFID tag is mainly divided into an active RFID tag and a passive RFID tag. For the active RFID tag, electric power can be supplied from an external power supply (such as a battery or a cell) to the RFID tag; and for the passive RFID tag, electric power of radio waves of the external read/write device is supplied to the RFID tag directly.

Since the RFID tag is thin, its application is convenient. The passive RFID tag is used mostly, but the passive RFID tag can just be used for signal transmissions within a short distance for a short time. If the distance of a read/write device is far from the RFID tag, then the signal transmission will become very weak. Therefore, the passive RFID tag always has the issue of insufficient transmission distance. Although the active RFID tag can be used as a device to substitute the passive RFID tag for long-distance signal transmissions, most power supply devices of the traditional active RFID tag are battery manufactured by old manufacturing processes, and thus the active RFID tag not just comes with a large volume only, but also consumes much power. Therefore, it is necessary to develop a RFID device capable of overcoming the transmission distance, volume, and power-saving issues concurrently.

SUMMARY OF THE INVENTION

In view of the problems of the prior art, it is a primary objective of this disclosure to provide an RFID device combined with a solar cell and a RFID tag and provided for active and passive data transmissions.

To achieve the aforementioned and other objectives, the present invention provides an active RFID device, comprising: at least one solar cell, including: a substrate; a first conductive layer, disposed on substrate; an electron supplying layer, disposed on the first conductive layer; an electron receiving layer, disposed on the electron supplying layer; and a second conductive layer, disposed on electron receiving layer; and a RFID tag, installed on the substrate and coupled to the solar cell through a telecommunication connection structure, and the RFID tag including a first antenna, a second antenna and a RFID chip, and the RFID chip including a first RFID module coupled to the first antenna, a second RFID module coupled to the second antenna, and a radio frequency determination module coupled to the first RFID module and the second RFID module, and the first antenna and the first RFID module passively receive a driving signal of an external device and return tag data, and the radio frequency determination module automatically determines the received external driving signal, and the second RFID module and the second antenna actively transmit the tag date to the external device according to the electric power supplied by the solar cell.

Preferably, the RFID tag further comprises a switching unit installed between the RFID chip and the first antenna and the second antenna, and provided for manually switching the first antenna or the second antenna to transmit the tag data.

Preferably, the solar cell further comprises a mixed electron supplying/receiving layer disposed between the electron supplying layer and the electron receiving layer.

Preferably, the RFID device further comprises a bonding layer disposed between the first conductive layer and the substrate, and disposed between the RFID tag and the substrate.

Preferably, the RFID device further comprises a first protective layer disposed on the solar cell and the RFID tag.

Preferably, the RFID device further comprises a second protective layer disposed on another side of the substrate opposite to the bonding layer.

Preferably, the first protective layer further has a notch formed at a position corresponsive to the RFID tag.

Preferably, the RFID device comprises an encapsulation layer disposed between the bonding layer and the first protective layer, or disposed between the first protective layer and the second protective layer.

Preferably, the substrate is a hard or soft opaque substrate.

Preferably, the substrate is a hard or soft transparent substrate.

Preferably, the substrate is a translucent plastic substrate or translucent glass substrate.

Preferably, the translucent plastic substrate is made of PET, PE, PMMA, PI, PA, PU or acrylic.

Preferably, the translucent plastic substrate has a thickness from 10 um to 500 um.

Preferably, the bonding layer is made of acrylic, epoxy resin, silicon dioxide or any combination of the ABOVE.

Preferably, the bonding layer has a thickness from 1 um to 5 um.

Preferably, the first conductive layer is partially etched to selectively form the conductive circuit.

Preferably, the first conductive layer is partially etched to selectively form the antenna.

Preferably, the first conductive layer is made of an organic material, an inorganic material or a combination of the two.

Preferably, the organic material is PEDOT, carbon nanotube, or a combination of the two.

Preferably, the inorganic material is a metal or a metallic oxide.

Preferably, the first conductive layer has a transmittance from 70% to 95%.

Preferably, the first conductive layer has a thickness from 100 nm to 10 um.

Preferably, second conductive layer and telecommunication connection structure is formed by screen printing a silver paste conductive coating.

Preferably, the second conductive layer and the telecommunication connection structure have a thickness from 1 um to 50 um.

Preferably, the first protective layer and the second protective layer are made of transparent plastic or glass and have a thickness from 50 um to 500 um.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

With reference to FIGS. 1 to 4 for the first to fourth schematic views of an RFID device in accordance with the first embodiment of the present invention respectively, the RFID device is integrated with an RFID tag and a solar cell, so that the RFID tag is capable of actively transmitting signals through the electric power of the solar cell to send tag data to an external device, and the RFID tag further includes another set of antenna and transmission module for passively receiving a driving signal of the external device and further obtaining the electric power to return the tag data. Therefore, the present invention has considered and achieved the effects of covering the transmission distance, reducing the volume, and saving power concurrently. The RFID device comprises a solar cell 10, an RFID tag 20 and a telecommunication connection structure 30, and the RFID tag 20 is coupled to the solar cell 10 through the telecommunication connection structure 30.

Figure 1:
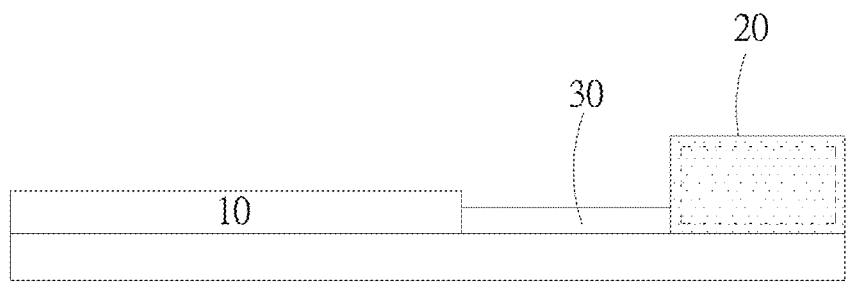
FIG. 1 is a first schematic view of an RFID device in accordance with a first embodiment of the present invention.
Figure 2:
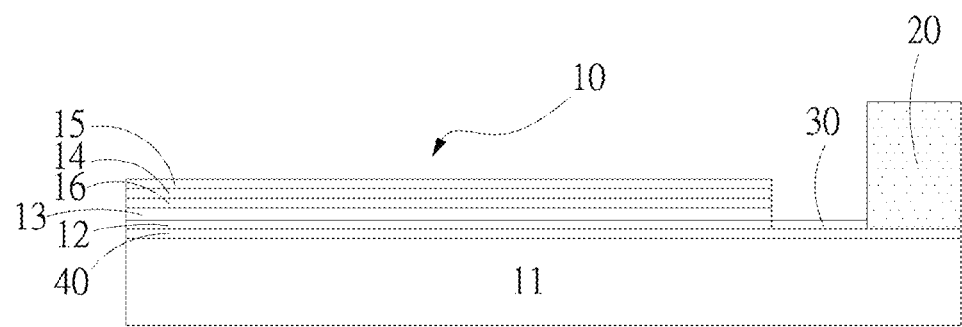
FIG. 2 is a second schematic view of an RFID device in accordance with the first embodiment of the present invention.
Figure 3:
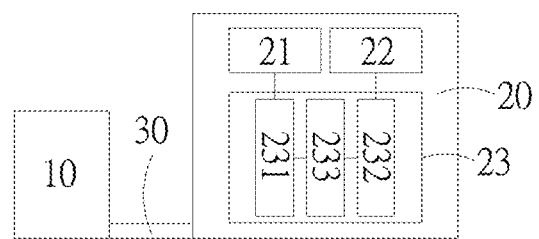
FIG. 3 is a third schematic view of an RFID device in accordance with the first embodiment of the present invention.
Figure 4:
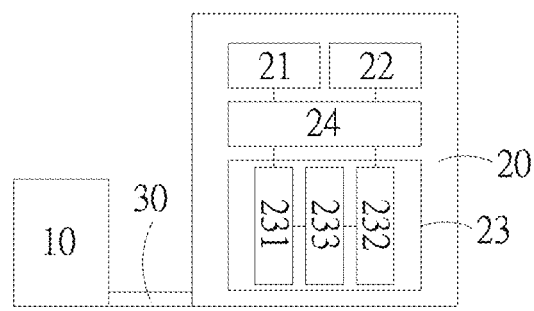
FIG. 4 is a fourth schematic view of an RFID device in accordance with the first embodiment of the present invention.

Specifically, the solar cell 10 comprises a substrate 11, a first conductive layer 12, an electron supplying layer 13, an electron receiving layer 14 and a second conductive layer 15 and further comprises a mixed electron supplying/receiving layer 16. The first conductive layer 12 is disposed on the substrate 11; the electron supplying layer 13 is disposed on the first conductive layer 12; the electron receiving layer 14 is disposed on the electron supplying layer 13; the second conductive layer 15 is disposed on the electron receiving layer 14, and the mixed electron supplying/receiving layer 16 is disposed between the electron supplying layer 13 and the electron receiving layer 14, wherein the first conductive layer 12 is preferably disposed on the substrate 11 through a bonding layer 40. The RFID tag 20 is installed on the substrate 11 and coupled to the first conductive layer 12 of the solar cell 10 the through the telecommunication connection structure 30, wherein the RFID tag 20 is preferably disposed on the substrate 11 through the bonding layer 40. The RFID tag 20 comprises a first antenna 21, a second antenna 22 and a RFID chip 23, and the RFID chip 23 comprises a first RFID module 231 coupled to the first antenna 21, a second RFID module 232 coupled to the second antenna 22, and a radio frequency determination module 233 coupled between the first RFID module 231 and the second RFID module 232, and the first antenna 21 and the first RFID module 231 are provided for passively receiving a driving signal of an external device and returning tag data. The radio frequency determination module 233 is capable of automatically determining the external driving signal, and the second RFID module 232 and the second antenna 22 actively transmit the tag data to the external device according to the electric power supplied by the solar cell 10. In short, the RFID tag 20 has both ACTIVE and passive functions, and when the passive function is performed, the power consumption of the solar cell 10 can be reduced. In addition, the RFID tag 20 further comprises a switching unit 24 installed between the RFID chip 23 and the first antenna 21 and the second antenna 22 as shown in FIG. 4, and the switching unit 24 is provided for users to manually switch to the first antenna 21 or the second antenna 22 in order to select the passive or active signal transmission function to transmit the tag data.

Wherein, the first conductive layer 12 is partially etched to selectively form the conductive circuit, or the first conductive layer 12 is partially etched to selectively form the antenna.

Wherein, the substrate 11 is a hard or soft opaque substrate or transparent substrate. If the transparent substrate is adopted, then it may be a translucent plastic substrate or a translucent glass substrate made of PET, PE, PMMA, PI, PA, PU or acrylic and has a thickness from 10 um to 500 um, but the invention is not limited to such arrangements only. The first conductive layer 12 is made of an organic material, an inorganic material, or a combination of the two, and the organic material is PEDOT, carbon nanotube, or a combination of the two, and the inorganic material is a metal or a metallic oxide, and the first conductive layer 12 has a transmittance from 70% to 95% and a thickness from 100 nm to 10 um, but the invention is not limited to such arrangements only. The second conductive layer 15 and the telecommunication connection structure 30 are formed and screen printed by a silver paste conductive coating and has a thickness from 1 um to 50 um, but the invention is not limited to such arrangement only. The bonding layer 40 is made of acrylic, epoxy resin, silicon dioxide, or any combination of the above and has a thickness from 1 um to 5 um, but the invention is not limited to such arrangements only.

Figure 5:
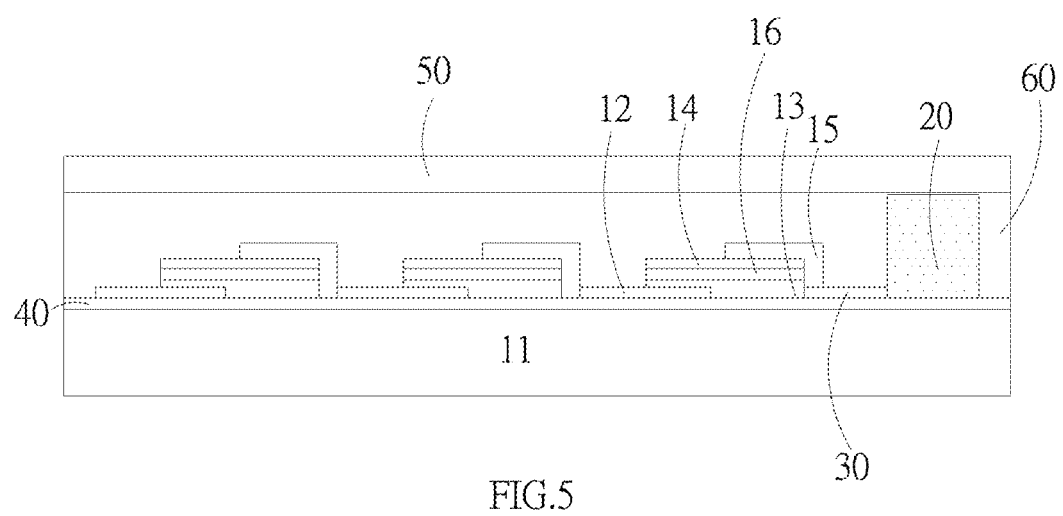
FIG. 5 is a schematic view of an RFID device in accordance with a second embodiment of the present invention.
Figure 6:
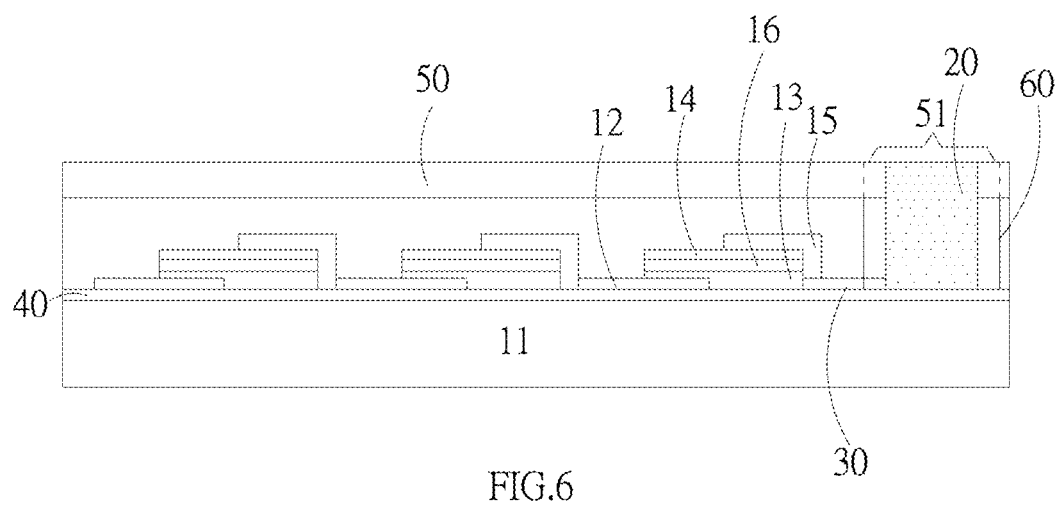
FIG. 6 is a schematic view of an RFID device in accordance with a third embodiment of the present invention.
Figure 7:
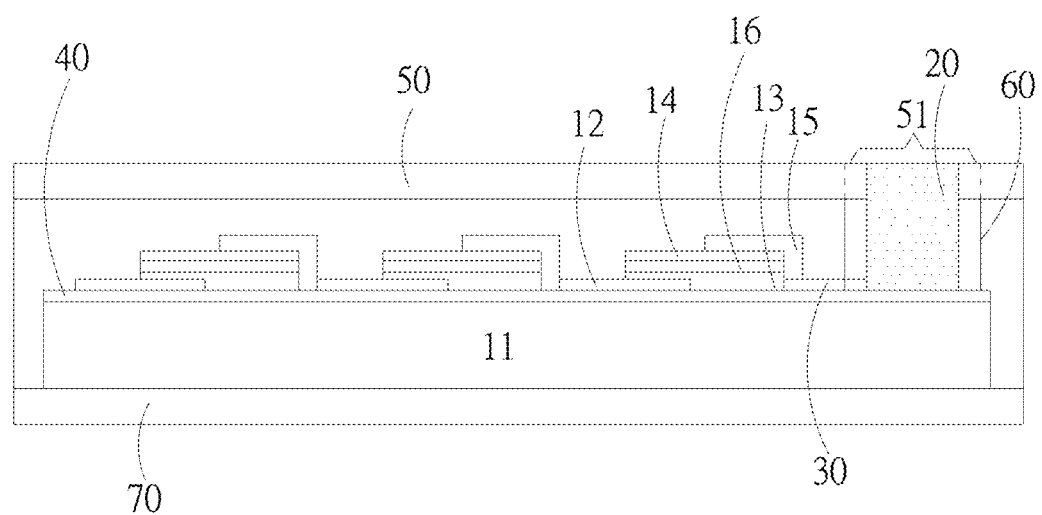
FIG. 7 is a schematic view of an RFID device in accordance with a fourth embodiment of the present invention.

With reference to FIGS. 5 to 7 for an RFID device in accordance with the second, third, and fourth embodiments of the present invention respectively, the second embodiment has a plurality of solar cells 10 and the RFID device of the second embodiment further comprises a first protective layer 50 and an encapsulation layer 60, and the first protective layer 50 is disposed on the solar cell 10 and the RFID tag 20, and the encapsulation layer 60 is disposed on between the bonding layer 40 and the first protective layer 50, and the encapsulation layer 60 is capable of packaging the solar cell 10 and the RFID tag 20 between the bonding layer 40 and the first protective layer 50. Compared with the second embodiment, the first protective layer 50 of the third embodiment further includes a notch 51 formed at a position corresponsive to the RFID tag 20 and provided for accommodating the RFID tag 20. Compared with the third embodiment, the RFID device of the fourth embodiment further comprises a second protective layer 70 disposed on another side of the substrate opposite to the bonding layer 40, and the encapsulation layer 60 is disposed between the first protective layer 50 and the second protective layer 70, so that the RFID tag 20 is packaged between the first protective layer 50 and the second protective layer 70. Preferably, the first protective layer 50 and the second protective layer 70 are made of transparent plastic or glass and have a thickness from 50 um to 500 um, but the invention is not limited to such arrangement only.

In summation of the description above, the RFID device of the present invention integrates the RFID tag with passive and active functions and the solar cell, so that the solar cell formed by a miniaturization process can reduce the total volume, and can convert light energy into electric energy to be supplied to the RFID tag, so as to achieve the energy saving effect In addition, the RFID device is capable of executing a corresponsive function to cope with different distances, so as to transmit the tag data in the best mode.

The present invention breaks through the prior art and definitely achieves the intended effects, and the invention is novel and is not apparent to or easily perceived by persons having ordinary skill in the art. In addition, the present invention is novel, inventive, useful, and in compliance with patent application requirements, and thus is duly filed for patent application.

While the ideas and technical characteristics of this disclosure have been described by means of specific embodiments, numerous modifications and variations could be made thereto by those skilled in the art without departing from the scope and spirit of this disclosure set forth in the claims.

What is claimed is:

1. A radio frequency identification (RFID) device, comprising:
    at least one solar cell, including: a substrate; a first conductive layer, disposed on the substrate; an electron supplying layer, disposed on the first conductive layer; an electron receiving layer, disposed on the electron supplying layer; and a second conductive layer, disposed on the electron receiving layer; and
    a RFID tag, installed on the substrate, and coupled to the solar cell through a telecommunication connection structure, and the RFID tag including a first antenna, a second antenna and a RFID chip including a first RFID module coupled to the first antenna, a second RFID module coupled to the second antenna, a radio frequency determination module coupled to the first RFID module and the second RFID module, and the first antenna and the first RFID module passively receiving a driving signal from an external device and returning tag data, and the second RFID module and the second antenna actively transmitting the tag data to the external device according to electric power supplied by the solar cell when the radio frequency determination module automatically determines an external driving signal, and a switching unit installed between the RFID chip and the first antenna and the second antenna, and provided for manually switching between the first antenna and RFID module or the second antenna and RFID module to transmit the tag data.

2. The RFID device according to claim 1, wherein the solar cell further comprises a mixed electron supplying/receiving layer disposed between the electron supplying layer and the electron receiving layer.

3. The RFID device according to claim 2, further comprising a bonding layer disposed between the first conductive layer and the substrate, and disposed between the RFID tag and the substrate.

4. The RFID device according to claim 3, further comprising a first protective layer, disposed on the solar cell and the RFID tag.

5. The RFID device according to claim 4, further comprising a second protective layer disposed on another side of the substrate opposite to the bonding layer.

6. The RFID device according to claim 4, wherein the first protective layer further has a notch formed at a position corresponsive to the RFID tag.

7. The RFID device according to claim 5, further comprising an encapsulation layer disposed between the bonding layer and the first protective layer, or disposed between the first protective layer and the second protective layer.

8. The RFID device according to claim 1, wherein the substrate is a hard or soft opaque substrate.

9. The RFID device according to claim 1, wherein the substrate is a hard or soft transparent substrate.

10. The RFID device according to claim 9, wherein the substrate is a translucent plastic substrate or translucent glass substrate.

11. The RFID device according to claim 10, wherein the translucent plastic substrate is made of a material selected from the group consisting of PET, PE, PMMA, PI, PA, PU and acrylic.

12. The RFID device according to claim 10, wherein the translucent plastic substrate has a thickness from 10 um to 500 um.

13. The RFID device according to claim 3, wherein the bonding layer is made of a material selected from the group consisting of acrylic, epoxy resin, silicon dioxide and any combination thereof.

14. The RFID device according to claim 3, wherein the bonding layer has a thickness from 1 um to 5 um.

15. The RFID device according to claim 1, wherein the first conductive layer is partially etched to selectively form a conductive circuit.

16. The RFID device according to claim 1, wherein the first conductive layer is partially etched to selectively form the antenna.

17. The RFID device according to claim 1, wherein the first conductive layer is made of an organic material, an inorganic material, or a combination thereof.

18. The RFID device according to claim 17, wherein the organic material is one selected from the group consisting of PEDOT, carbon nanotube, and a combination thereof.

19. The RFID device according to claim 17, wherein the inorganic material is a metal or a metallic oxide.

20. The RFID device according to claim 1, wherein the first conductive layer has a transmittance from 70% to 95%.

21. The RFID device according to claim 1, wherein the first conductive layer has a thickness from 100 nm to 10 um.

22. The RFID device according to claim 1, wherein the second conductive layer and the telecommunication connection structure are formed by screen printing a silver paste conductive coating.

23. The RFID device according to claim 1, wherein the second conductive layer and the telecommunication connection structure has a thickness from 1 um to 50 um.

24. The RFID device according to claim 5, wherein the first protective layer and the second protective layer are made of a transparent plastic or glass and has a thickness from 50 um to 500 um.

\* \* \* \* \*